United States Patent
Brandsma et al.

(10) Patent No.: US 9,514,339 B2
(45) Date of Patent: Dec. 6, 2016

(54) CONTROL METHOD, CONTROLLED DEVICE, USER INTERACTION DEVICE AND COMPUTER PROGRAM PRODUCT

(71) Applicant: NXP B.V., Eindhoven (NL)

(72) Inventors: Ewout Brandsma, Eindhoven (NL); Timotheus Arthur van Roermund, Eindhoven (NL); Maarten Christiaan Pennings, Waalre (NL)

(73) Assignee: NXP B.V., Eindhoven (NL)

( * ) Notice: Subject to any disclaimer, the term of this patent is extended or adjusted under 35 U.S.C. 154(b) by 488 days.

(21) Appl. No.: 13/862,316

(22) Filed: Apr. 12, 2013

(65) Prior Publication Data

US 2013/0271268 A1  Oct. 17, 2013

(30) Foreign Application Priority Data

Apr. 12, 2012  (EP) ..................................... 12163933

(51) Int. Cl.
*H04Q 5/22*  (2006.01)
*G06K 7/10*  (2006.01)
(Continued)

(52) U.S. Cl.
CPC ......... *G06K 7/10009* (2013.01); *G06K 7/0008* (2013.01); *G06K 19/0716* (2013.01); *G06K 19/0723* (2013.01)

(58) Field of Classification Search
CPC ............ G06K 7/10366; G06K 7/10009; G06K 19/0723; G06K 7/0008; G08C 19/28; G08C 17/02; G08C 2201/20; G07C 9/00182; G07C 2009/00849
(Continued)

(56) References Cited

U.S. PATENT DOCUMENTS 5,565,855 A  10/1996  Knibbe
6,174,073 B1  1/2001  Regan et al.
(Continued)

FOREIGN PATENT DOCUMENTS

CN  1766903 A  5/2006
CN  101951335 A  1/2011
(Continued)

OTHER PUBLICATIONS

"Remote UI Client and Server V 1.0", 1 pg, retrieved from the internet at: http://upnp.org/specs/rui/remoteui/ (Aug. 25, 2004).
(Continued)

*Primary Examiner* — Kerri McNally
*Assistant Examiner* — Sharmin Akhter

(57) ABSTRACT

A method for controlling a controlled device is disclosed, wherein the controlled device has a host connection to an RFID tag, the method comprising the following steps: (s1) the controlled device writes operational parameters to the RFID tag through the host connection; (s2) a user interaction device reads the operational parameters from the RFID tag through an RFID connection; (s3) a user changes the operational parameters via a user interface comprised in the user interaction device; (s4) the user interaction device writes the operational parameters to the RFID tag through the RFID connection; (s5) the controlled device reads the operational parameters from the RFID tag through the host connection and adapts its behavior based on the operational parameters. Furthermore, a corresponding controlled device, a user interaction device and a computer program product are disclosed.

8 Claims, 2 Drawing Sheets

(51) Int. Cl.
*G06K 7/00* (2006.01)
*G06K 19/07* (2006.01)

(58) Field of Classification Search
USPC ............... 340/10.1–12.29, 572.1–572.9, 3.1, 5.6,340/5.72, 426.35, 426.36, 538.11, 539.1; 235/375–385
See application file for complete search history.

(56) References Cited

U.S. PATENT DOCUMENTS

| | | | |
|---|---|---|---|
| 6,229,433 B1 | 5/2001 | Rye et al. | |
| 6,667,690 B2 | 12/2003 | Durej et al. | |
| 7,174,227 B2 | 2/2007 | Kobayashi et al. | |
| 7,250,695 B2 * | 7/2007 | Connors | G06K 19/0705 307/117 |
| 7,825,776 B2 | 11/2010 | Smith et al. | |
| 8,098,160 B2 * | 1/2012 | Howarth | G08B 13/2417 340/10.41 |
| 2002/0170952 A1 | 11/2002 | Alsafadi et al. | |
| 2003/0137396 A1 | 7/2003 | Durej et al. | |
| 2005/0093374 A1 | 5/2005 | Connors et al. | |
| 2006/0049935 A1 | 3/2006 | Giannopoulos et al. | |
| 2007/0047749 A1 | 3/2007 | Kasztelan et al. | |
| 2008/0048837 A1 | 2/2008 | Montgomery et al. | |
| 2008/0204199 A1 | 8/2008 | Howarth et al. | |
| 2008/0204249 A1 | 8/2008 | Chang et al. | |
| 2008/0211427 A1 | 9/2008 | Budde et al. | |
| 2009/0009358 A1 | 1/2009 | Munzebrock | |
| 2009/0121865 A1 | 5/2009 | Hamel et al. | |
| 2011/0143661 A1 | 6/2011 | Hartwig et al. | |
| 2012/0133841 A1 * | 5/2012 | Vanderhoff et al. | 348/734 |
| 2012/0176244 A1 * | 7/2012 | Niederhuefner | G08B 13/1427 340/568.1 |
| 2013/0076491 A1 | 3/2013 | Brandsma et al. | |
| 2013/0141223 A1 | 6/2013 | Brandsma et al. | |
| 2013/0198813 A1 | 8/2013 | Van Roermund et al. | |
| 2013/0211761 A1 | 8/2013 | Brandsma et al. | |

FOREIGN PATENT DOCUMENTS

| | | |
|---|---|---|
| CN | 102324050 A | 1/2012 |
| DE | 199 40 651 A1 | 3/2001 |
| DE | 10 2006 035 011 B4 | 1/2008 |
| EP | 1 479 988 A2 | 11/2004 |
| EP | 2 050 863 A1 | 4/2009 |
| WO | 2006/016845 A1 | 2/2006 |
| WO | 2006/020152 A1 | 2/2006 |
| WO | 2007/016101 A1 | 2/2007 |
| WO | 2008/085423 A1 | 7/2008 |
| WO | 2010/032227 A1 | 3/2010 |
| WO | 2011/057194 A1 | 5/2011 |

OTHER PUBLICATIONS

"Remote Desktop Protocol", Microsoft, 5 pgs. retrieved from the internet at: http://msdn.microsoft.com/en-us/library/aa383015.aspx (2011).
"Virtual Network Computing", Wikipedia, 5 pgs, Apr. 10, 2013 retrieved from the internet at: http://en.wikipedia.org/wiki/Virtual_Network_Computing.
"STMicroelectronics Facilitates Contactless Communication between Mobile Phones and Other Electronic Device", ST Electronics, 2 pgs, retrieved from the internet at: http://www.st.com/internet/com/press_release/t3102.jsp (Jan. 19, 2012).
Extended European Search Report for Patent Appln. 12163933.0 (Sep. 24, 2012).
"Wi-Fi Protected Setup Specification—Version 1.0", 109 pgs, WiFi Alliance, retrieved from the internet at: https://login.wi-fi.org/login.php?resume=/idp/resumeSAML20/idp/SSO.ping&spentity=www.wi-fi.org (Sep. 2006).

* cited by examiner

CONTROL METHOD, CONTROLLED DEVICE, USER INTERACTION DEVICE AND
COMPUTER PROGRAM PRODUCT

CROSS-REFERENCE TO RELATED
APPLICATIONS

This application claims the priority under 35 U.S.C. §119 of European patent application no. 12163933.0, filed on Apr. 12, 2012, the contents of which are incorporated by reference herein.

FIELD OF THE INVENTION

The invention relates to a method for controlling a controlled device. The invention also relates to a controlled device, a user interaction device and a computer program product.

BACKGROUND OF THE INVENTION

In recent decades numerous types of electronic devices have appeared on the market with ever increasing functionality which has been enabled by a continued increase in digital processing capabilities. For example, energy-frugal sensor nodes enable securely logging and/or transmitting all kinds of sensory data, household appliances—such as for example washing machines and kitchen ovens—get more and more features to control both their primary process as well as their energy consumption, and electronic watches and time-controlled electric plugs (also known as time switches) have a plethora of functions nowadays.

For many of these devices, their user interaction means have not kept up with the increase in functionality. For example, an energy-frugal sensor node is very small and may not be able to accommodate more user interaction means than just one or two buttons. Also, it is very energy-constrained and may therefore not be able to drive a display or even just a few LED's. Electronic watches and time-controlled electric plugs do have a display, but typically have very few buttons to control their operation, making a simple task—such as setting the time—a tedious task for many end-users.

There are prior art methods which control a first device by utilizing user interaction means on a second device. For example, it is known for a UPnP device to expose a user interface to another UPnP device (see "Remote UI Client and Server V 1.0" by the UPnP Forum, retrievable from http://upnp.org/specs/rui/remoteui/). UPnP devices are connected by means of a (wired or wireless) IP connection. Similarly, it is known for a computing device to take control of another computing device using remote desktop protocols such as RDP and VNC (see "Remote Desktop Protocol" by Microsoft, retrievable from http://msdn.microsoft.com/en-us/library/aa383015.aspx, and "Virtual Network Computing" by Wikipedia, retrievable from http://en.wikipedia.org/wiki/Virtual_Network_Computing). These protocols also take place over a (wired or wireless) IP connection. Most of these solutions are primarily meant to enable controlling a device from another location. The controlled device may or may not have rich user interaction means of its own, i.e. a local user interface.

Design constraints for a device—for example cost, form factor, power budget, or the physical environment that the device is to be deployed in—may limit the possibilities for user-friendly interaction with that device. Specifically, it may not be possible to equip the device with rich user interaction means, such as a touch screen. Instead, the device may have been equipped with very simple user interaction means, for example very few buttons which much be pressed in a specific sequence to use certain functionality on the device.

Interaction using such simple means is far from intuitive and may cause, at least, a lot of frustration and wasted time for end-users. Effectively, it may even mean that an end-user is not able to perform a desired task using the device at all. If the user would have had the ability to control the same device with a rich user interface instead, such as a touch screen, he/she would have been able to complete the desired tasks quicker, more reliably, and with less frustration. In the light of the ever increasing functionality enabled by such devices, this problem will only intensify.

Existing remote user interface (UI) solutions (such as UPnP RUI, RDP or VNC) require a data connection to be established between the device to be controlled and the device providing the user interaction means. This may be a wired or a wireless data connection (for example a Wi-Fi connection). Establishing a wired or wireless data connection requires additional actions on behalf of the end-user and is often cumbersome. Furthermore, requiring a device to possess a wired or wireless interface for such a data connection may conflict with constraints such as low cost, low power usage and/or small form factor.

SUMMARY OF THE INVENTION

It is an object of the invention to improve the user interaction with controlled devices which have constraints on their user interaction means. This object is achieved by a method as defined in claim 1, a controlled device as defined in claim 12, a user interaction device as defined in claim 14, and a computer program product as defined in claim 16.

According to an aspect of the invention, a method for controlling a controlled device is conceived, wherein the controlled device has a host connection to an RFID tag, the method comprising the following steps: (s1) the controlled device writes operational parameters to the RFID tag through the host connection; (s2) a user interaction device reads the operational parameters from the RFID tag through an RFID connection; (s3) a user changes the operational parameters via a user interface comprised in the user interaction device; (s4) the user interaction device writes the operational parameters to the RFID tag through the RFID connection; (s5) the controlled device reads the operational parameters from the RFID tag through the host connection and adapts its behavior based on the operational parameters.

According to an exemplary embodiment of the invention, in step (s1), a host controller comprised in the controlled device writes the operational parameters to the RFID tag through the host connection; and in step (s5), the host controller adapts the behavior of the controlled device by configuring a set of controlled functions based on the operational parameters.

According to a further exemplary embodiment of the invention, the RFID tag sends a wake-up signal to the controlled device upon a predetermined event, such that the controlled device wakes up from an off state or low-power state.

According to a further exemplary embodiment of the invention, the predetermined event is a detection of an RF field by the RFID tag or the establishment of the RFID connection.

According to a further exemplary embodiment of the invention, the predetermined event is the writing of the operational parameters to the RFID tag in step (s4) or the disappearance of the RF field or the RFID connection in step (s4).

According to a further exemplary embodiment of the invention, a handshake protocol is executed between the user interaction device and the controlled device via the RFID tag, such that the controlled device may return to the off state or low-power state if it does not need to perform a step of the method.

According to a further exemplary embodiment of the invention, the handshake protocol comprises that the user interaction device changes a signaling flag comprised in the RFID tag; the signaling flag indicates whether or not the controlled device needs to perform a specific step of the method; and, upon waking up, the controlled device reads the signaling flag and returns to the off state or low-power state if the signaling flag indicates that it does not need to perform any specific step of the method.

According to a further exemplary embodiment of the invention, the RFID tag only provides the wake-up signal to the controlled device if predetermined sections of a memory comprised in the RFID tag are read from and/or written to by the user interaction device; wherein the predetermined sections of the memory contain operational parameters relating to operations that require a wake-up of the controlled device.

According to a further exemplary embodiment of the invention, the operational parameters include a description of the user interface comprised in the user interaction device.

According to a further exemplary embodiment of the invention, the description of the user interface embeds operational parameters which directly relate to the functioning of the controlled device.

According to a further exemplary embodiment of the invention, the description of the user interface is provided by reference, in particular by a URL pointing to a website from which the description of the user interface is retrievable.

According to a further aspect of the invention, a controlled device for use in a method of the kind set forth is conceived.

According to a further exemplary embodiment of the invention, the controlled device is one of the group of: an energy-frugal sensor node, a household appliance, a time-controlled electric plug, an electronic watch. According to a further aspect of the invention, a user interaction device is conceived, in particular a portable user interaction device, for use in a method of the kind set forth.

According to a further exemplary embodiment of the invention, the user interaction device is an NFC-enabled smart phone or a web tablet.

According to a further aspect of the invention, a computer program product is conceived which comprises program elements executable by a controlled device or a user interaction device, wherein each program element comprises program instructions which, when being executed by the controlled device or the user interaction device, cause said controlled device and user interaction device to carry out or control respective steps of a method of the kind set forth.

BRIEF DESCRIPTION OF THE DRAWINGS

The invention will be described in more detail with reference to the appended drawings, in which.

DESCRIPTION OF EMBODIMENTS

According to an aspect of the invention, a method is conceived which enables a user to interact with a device (i.e. a controlled device) which does not comprise user interaction means, or which only comprises minimal user interaction means. The method involves a second device (i.e. a user interaction device) which may comprise rich user interaction means.

Figure 1:
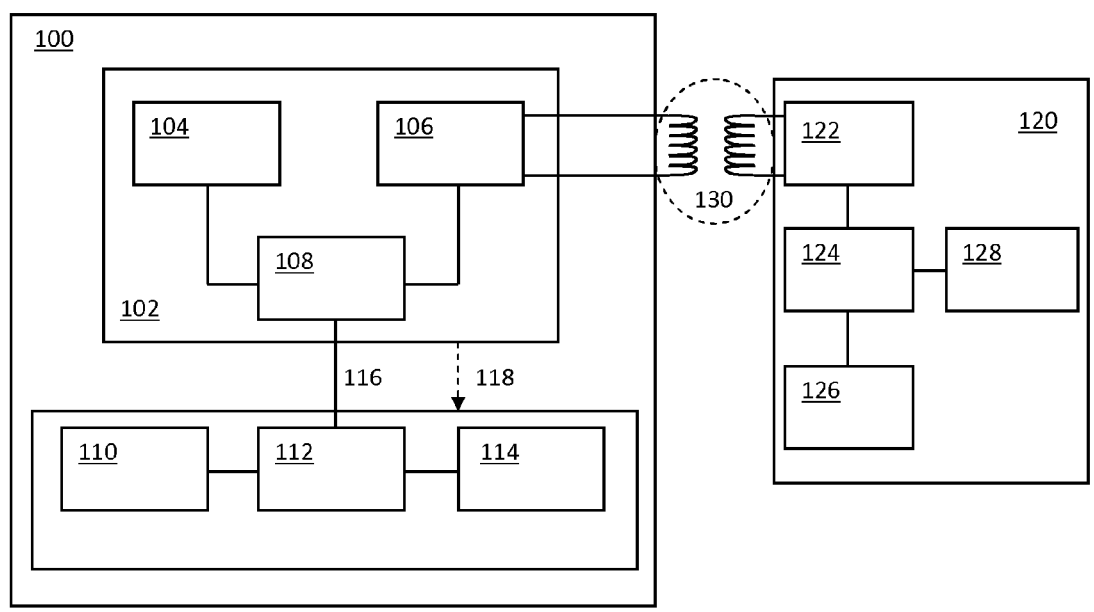
FIG. 1 illustrates exemplary embodiments of a controlled device and a user interaction device according to the invention.

FIG. 1 illustrates exemplary embodiments of a controlled device 100 and a user interaction device 120 according to the invention. Effectively, the controlled device 100 and the user interaction device 120 form a system in which the above-mentioned method can be applied.

The controlled device 100 comprises a host controller 112 and a so-called Connected Tag 102. A "Connected Tag" is defined as an RFID tag which has a host connection 116, i.e. a wired connection, to the host controller 112. The Connected Tag 102 comprises a non-volatile memory 104, a (passive) RFID interface 106 for contactless reading/writing of the non-volatile memory 104, a tag controller 108 for controlling the functions of the tag and a wired interface 116 with the host controller 112 (i.e. the host connection) enabling the reading/writing of the non-volatile memory 104 by that host controller 112. The controlled device 100 may for example be an energy-frugal sensor node, a household appliance such as a washing machine or a kitchen oven, a time-controlled electric plug or an electronic watch. The user interaction device 120 comprises an NFC interface device or an active RFID device 122. The NFC interface device or active RFID device 122 is able to read/write data from/to the Connected Tag 102, while supplying power to the Connected Tag 102. The user interaction device 120 may, for example, be an NFC-enabled smart phone or a web tablet with a touch screen as user interaction means.

An exemplary embodiment of a method according to the invention comprises the steps of:

(1) The host controller 112 of the controlled device 100 writes certain operational parameters initially or regularly into the non-volatile memory 104 of the Connected Tag 102.

(2) The end-user brings the user interaction device 102 into close proximity of the controlled device 100 and the user interaction device 102 reads the operational parameters from the non-volatile memory 104 of the Connected Tag 102.

(3) The end-user interacts with a user interface 126 comprised in the user interaction device 120, which results in new and/or updated operational parameters for the controlled device 100.

(4) The end-user brings the user interaction device 120 again into close proximity of the controlled device, or, alternatively, it is kept in close proximity during the whole procedure. Subsequently, the user interaction device 120 writes the new and/or updated operational parameters into the non-volatile memory 104 of the Connected Tag 102.

(5) The host controller 112 reads the new and/or updated operational parameters from the non-volatile memory 104 of the Connected Tag 102 and subsequently adapts the behavior of the controlled device 100 based on these operational parameters. It should be observed that steps (1) and (5) are executed under control of the controlled device 100, whereas steps (2), (3) and (4) are consecutively executed under control of the user interaction device 120. It is not necessary for step (1) to be immediately followed by steps (2), (3) and (4). Likewise, it is not necessary for steps (2), (3) and (4) to be immediately followed by step (5). In other words, there may be an unspecified time lag between the execution of step (1) on one hand and steps (2), (3) and (4) on the other hand. Similarly, there may be an unspecified time lag between steps (2), (3) and (4) on one hand and step (5) on the other hand. Furthermore, it is possible for step (1) to be executed multiple times, before executing steps (2), (3) and (4) or for steps (2), (3) and (4) to be executed multiple times without step (1) being executed in between. Similarly, it is possible for steps (2), (3) and (4) to be executed multiple times before executing step (5) once.

It is noted that instead of the non-volatile memory 104 another type of memory may be implemented on the Connected Tag 102. However, it is important that the contents of the memory can be retained when no external power is supplied to the Connected Tag 102. In particular, the new and/or updated operational parameters should remain available to the host controller 112 after disappearance of the RF field, so that the host controller 112 may perform step (5) at any time. In principle this may also be achieved with a volatile memory and a battery backup.

In short, the controlled device 100 does not have to be equipped with rich user interaction means, while it still enables rich user interaction via the user interaction device 120. This reduces cost and/or relaxes other design constraints for the controlled device 100. For example, the controlled device 100 has no room for a touch screen or is used in a harsh environment where the touch screen may get dirty or even be destroyed. As a matter of fact, the controlled device 100 may be completely stripped of any user interaction means, which further lowers its cost and further increases its design freedom. For example, an energy-frugal sensor node according to an embodiment of the invention requires no buttons or LED's at all (it is even conceivable to completely mold it in Perspex, making it very robust against dirt and other environmental influences). Likewise, a household appliance or time-controlled electric plug requires neither buttons nor a display and an electronic watch may require fewer buttons.

Compared to other remote user interface (UI) techniques utilizing wireless communications (e.g. UPnP Remote UI, RDP or VNC) the above-described method lowers cost (a Connected Tag 102 is very cost effective), simplifies session setup (the user interaction device 120 may simply be held close to the controlled device 100) and may even support interaction with the controlled device 100 whilst the latter is powered down. Furthermore, the energy needed by the controlled device 100 to accomplish the user interaction may be significantly lower as it needs to power neither user interaction means nor a radio for wireless communications. This is important if the controlled device 100 is significantly more energy-constrained than the user interaction device 120, for example, when a smart phone is used to configure an energy-frugal sensor node.

In addition to the system elements introduced above, the controlled device 100 also comprises a host memory 110 used by the host controller 112 and a set of controlled functions 114. The controlled functions 114 embody any of the primary functions of the controlled device 100, for example: sensors and storage and/or data transmission means in an energy-frugal sensor node, motors, heaters and valves in a washing machine, heating elements, fans and a microwave tube in a kitchen oven, relay and timing functions in a time-controlled electric plug, or timing functions in an electronic watch. The host controller 112 controls these functions 114 in accordance with the operational parameters.

Furthermore, the user interaction device 120 comprises a controller 124, a memory 128, and a user interface 126 (i.e. user interaction means). The controller 124 may execute a program element which implements particular steps of the method, i.e. steps (2), (3), and (4)) and utilizes the memory 128, the user interface 126, and the NFC interface device or active RFID device 122 for this purpose. As an optional feature, a wake-up signal 118 may be provided. For example, upon interaction of the NFC interface device or active RFID device 122 with the RFID interface 106—e.g. to read from or write to the non-volatile memory 104 in general or from or to specific parts thereof—the wake-up signal 118 is raised by the Connected Tag 102 to wake up the host controller 112 from an off state or low-power state.

In the following paragraphs exemplary applications of a method of the kind set forth, i.e. of the exemplary embodiment of a method according to the invention, will be described. In particular, the controlled device for use in this method may be an energy-frugal sensor node, a hearing aid, a household appliance, and a time-controlled electric plug or socket.

Energy-Frugal Sensor Node

An energy-frugal sensor node is a device that measures one or more physical quantities, for example, lighting level, temperature, air pressure, air flow, motion and concentrations of gases like relative humidity, $CO_2$, CO, $O_2$, ethylene and volatile organic compounds. It comprises means to store and/or wirelessly transmit these measurements for further usage.

An energy-frugal sensor node typically operates in a duty-cycled fashion, i.e. waking up periodically from a very low power sleep mode for a very short period of time to perform and store/transmit some measurements and subsequently reverting back to the sleep mode. This duty-cycled operation makes the sensor node so energy-efficient that it can live on a small battery for many years or can even harvest its energy from the ambient.

One example of an energy-frugal sensor node is a data logging device for monitoring the quality of perishable products (e.g. food or medicine). The device is attached to a pallet of products or even to an individual product (e.g. a milk carton) and logs the environmental conditions during distribution or even during the entire lifetime of the product. Inspection of the logs can be used to assess the quality of the product (e.g. remaining shelf life). It is obvious that cost, power, and form factor constraints are so strict that the device cannot comprise rich (or even any) user interaction means. Using a low-cost Connected Tag of the kind set forth enables a rich user interaction on a user interaction device instead (even while the device is asleep or its battery is depleted).

The user interaction could, for example, involve browsing the logged data, resetting the logged data when attaching the device to another pallet and modifying configuration settings such as the periodicity, the set of physical quantities to measure and the associated measurement accuracies.

Another example is an in-body implant such as an intraocular implant or a subcutaneous implant that monitors and logs biologically relevant parameters in a human or an animal. Power and form factor constraints are extremely strict and external self-powered user interaction is probably the only possibility to read out and configure the implant.

Yet another example of an energy-frugal sensor node is a wireless sensor node applied in, for example, a building control system or for structural integrity monitoring of constructions such as bridges. In this case, the measurements are transmitted periodically over a wireless network interface. Although the wireless network interface provides, in principle, means to remotely interrogate and configure the device, this may be difficult in practice. In order to be sensitive to interrogation and configuration requests (e.g. read out the current sensor values, set the periodicity or set the set of physical quantities and associated accuracies) the device must be in receive-mode permanently or at least at well agreed moments in time. When the device is in receive-mode frequently, its energy reserves may be depleted quickly. When the device is in receive-mode very infrequently the interaction may have very long response times. Therefore, interaction by means of a method of the kind set forth enables low power usage while maintaining short response times. Also, the wireless network interface may not be usable at all before the device is configured (i.e. chicken-and-egg problem). Furthermore, if this device is one of a plurality of similar devices connected to the wireless network, a method of the kind set forth enables very intuitive selection of this particular device—as opposed to another device in the plurality—for subsequent user interaction by merely bringing the user interaction device in its proximity.

Hearing Aid

Another example of a small form factor device is a hearing aid. It needs to fit in/on the auricle and, for aesthetic reasons, be as small as possible, meaning that there is no room on the device itself for rich user interaction means. On the other hand, in order to personalize the hearing aid, a wide variety of audio parameters (e.g. amplification per frequency band) needs to be configured. Furthermore, during a session with the audiologist, small adaptations to the settings may need to be made interactively. Providing rich user interaction by means of the method according to the invention enables the audiologist to do his job properly and efficiently, while the small form factor (i.e. aesthetics) constraints are still satisfied. Similarly, the end-user of the hearing aid may need to change settings such as the volume or to enable a specific mode of operation such as "speech-mode", "music-mode" or "TV-mode" (i.e. using an inductance loop to pick up the TV sound). Also that is easily accomplished with a method of the kind set forth: tap the phone to the ear (i.e. hearing aid), change the settings on the touch screen and tap it once again.

Household Appliance

Household appliances such as washing machines, tumble dryers, dish washers and kitchen ovens tend to get more and more integrated functionality. As user interaction means not always scale up with this increase in functionality, the end-user experience may suffer.

For example, a washing machine, tumble dryer or dish washer offers a wide variety of programs and may additionally have means to adapt its schedule to variable energy pricing schemes. This means complex user interaction may be required to use the appliance properly. Design constraints may seriously limit the amount of space available for providing user interaction means. For example, for aesthetic reasons, a dish washer may have to be hidden behind wood paneling. As a result, the user interaction means may end up on the top side of the door, that is only a few centimeters high. A touch screen at that location is clearly out of the question, not only for form factor reasons, but also considering the high temperatures and humidity it may be exposed to. Furthermore, the user interaction means are not accessible (or even visible) during operation of the dish washer, implying for example that the end-user is not kept informed about the progress of the dish washing process (e.g. time to completion). A method of the kind set forth provides a convenient way to interact with the household appliance and change its operational parameters.

As another example, a high-end kitchen oven offers a wide variety of heating options (e.g. bottom heat, top heat, hot air, hot air for multiple layers, grill, microwave, steam, incineration cleaning and many combinations and intensity settings thereof), time functions, pre-programmed preparation schedules, etcetera. Yet, such a kitchen oven has to fit a standard-sized kitchen cabinet. For example, a so-called "compact" oven has to fit a 560×450×550 mm3 (w×h×d) cabinet. Within this form factor the actual oven cavity should have maximum dimensions to be able to prepare as much food as possible. This struggle for space can be observed from the fact that appliance manufacturers have moved the user control panel from the right hand side to the top side of the oven; a wider, yet lower oven cavity being the result. Using a method of the kind set forth, a UI-less kitchen oven with a wide and high oven cavity could be provided that can be conveniently programmed by means of a rich user interaction device such as a smart phone or a web tablet.

Time-Controlled Electric Plug or Socket

A time-controlled electric plug is a device that can switch mains powered loads on or off based on a pre-determined time schedule. Typically it can be inserted into an electric power outlet and it comprises an electric power outlet by itself to plug in the load.

For example, it is often used to switch lighting on and off in a home to create the impression that someone is at home to scare off potential burglars (in this case, a partially randomized time schedule may be employed). As another example, it can be used to switch heating devices (such as an electric water boiler or a waterbed) on only when electricity is available at a low tariff.

Anyway, time-controlled electric plugs are available on the market either comprising a mechanical clock or an electronic clock. In case of a mechanical clock, it is programmed by means of putting pins in holes or by toggling mechanical levers. In case of an electronic clock, it is programmed by utilizing user interaction means, for example, a small LCD display and a handful of buttons. The programming of such a prior art time-controlled electric plug is often cumbersome. Having few buttons implies that very specific sequences of button presses are needed to accomplish a certain task. In many cases these sequences are not intuitive and also the result of the task cannot be easily verified, just adding to end-user frustration. Furthermore, it is only possible to program the plug when it is plugged into a mains outlet (unless when a battery is inserted), which may be cumbersome if the plug is installed in a hard to reach place. And finally, even though the user interaction means are relatively limited, there is still significant cost associated with providing them.

According to an exemplary embodiment of the invention, the time-controlled electric plug comprises no user interaction means, but only a Connected Tag. This has a number of benefits:

(1) The cost of the plug can be lower, because the cost of a Connected Tag is much lower than the cost of above-mentioned user interaction means.

(2) The form factor of the plug can be much smaller as no room is needed for user interaction means; as a matter of fact the "plug" could be completely integrated into a wall socket.

(3) The user interaction device provides much richer user interaction means (e.g. touch screen) making the interaction more intuitive and better to verify, thereby reducing the probability of end-user frustration.

(4) If the plug is installed in a hard to reach place, user interaction can still take place while holding the user interaction device conveniently in the palm of one's hand. Only the act of bringing the user interaction device into close proximity of the plug requires access to the plug itself, but this act is much simpler to perform in a hard to reach place (e.g. a dark corner in the back of a closet) than actual user interaction.

User Interaction with a Controlled Device that is Switched Off

A method of the kind set forth also permits control over the controlled device 100 even while it is switched off. This is enabled by the fact that the Connected Tag 102 contains a non-volatile memory 104 and that the NFC interface device or active RFID device 122 comprised in the user interaction device 120 is able to power the interaction with the Connected Tag 102. In this way, the controlled device 100 neither has to be switched on all the time, nor does the end-user have to switch it on explicitly before starting interaction (and switch it off again after completing interaction).

Basically, step (1) of the method of the kind set forth is performed by the controlled device 100 at a moment that it is active (i.e. switched on), which may be different from the moment that user interaction takes place. At some later moment, the controlled device 100 might be switched off and actual user interaction, i.e. steps (2), (3), and (4), takes place. At yet a later moment, the controlled device 100 might be active again and take the changed operational parameters that resulted from this user interaction into account for its subsequent operation, i.e. the controlled device 100 performs step (5).

Clearly, it might be undesirable for a controlled device 100 to be switched on all the time, because its power consumption could increase significantly. For example, an energy-frugal sensor node can only function if it only wakes up periodically for a very short period of time. This is known as duty-cycled operation.

Similarly, it might be undesirable for an end-user having to switch on/off the controlled device 100 explicitly, as this may complicate the process of user interaction. Furthermore, in the case of the energy-frugal sensor node, even the relatively short period that it would be switched on (i.e. for the duration of the process of user interaction) would be too long and deplete its energy reserves.

Wake up Host Controller During or Following Interaction

As explained above, using a method of the kind set forth enables user interaction with a controlled device 100 whilst the controlled device is switched off. Although this ability has clear benefits (i.e. lower energy consumption and/or simplified user interaction), it also has certain drawbacks: (A) the operational parameters read from the controlled device 100 in step (2) of the method were determined the last time the controlled device 100 was switched on and (B) the updated operational parameters written into the controlled device 100 in step (4) will only influence the behavior of the controlled device 100 the next time it is switched on. In other words, there may be a serious time lag between performing steps (1) and (2) and similarly between performing steps (4) and (5). This means that the user interaction may be based on 'old' operational parameters from the controlled device 100 and similarly that the controlled device 100 may only act on the updated operational parameters significant time after the user interaction took place.

As a first example, if the controlled device 100 is an energy-frugal sensor node comprising one or more sensors and if its sensors' measurements can be displayed by means of the user interaction device 120, the time lag between performing steps (1) and (2) may imply that the sensor values as displayed may be outdated.

As a second example, if the controlled device 100 is a washing machine that is programmed by means of the user interaction device 120 to start a program at some future moment in time, the washing machine might only become aware of this fact after the moment passed. The reason is that step (5)—setting a timer controlled by the washing machine's host controller 112—is not immediately triggered by the occurrence of step (4); writing the new programming into the Connected Tag 102.

As a third example, if the controlled device 100 is a device comprising a real-time clock—for example, a time-controlled electric plug or an electronic watch—and if the user interaction device 120 is used to set this clock to the correct time, the following might occur. As part of step (2) the user interaction device 120 would read the 'current' time that was stored into the Connected Tag 102 by the controlled device 100 a certain amount of time before that as part of step (1). Clearly, in the mean time, this time is not correct anymore and only confuses the end-user.

A further exemplary embodiment of the invention, which will be described in more detail below, enables steps (1) and (2) respectively (4) and (5) to follow each other instantaneously to avoid the drawbacks described above, while it is still neither necessary to keep the controlled device 100 powered all the time, nor to have the end-user switch it on and off manually. The optional wake-up signal 118 mentioned earlier plays a pivotal role in this exemplary embodiment and is briefly explained first.

Wake-Up Signal

The basic principle of the wake-up signal 118 is as follows. The wake-up signal 118 is provided from the Connected Tag 102 to the host controller 112 of the controlled device 100. When an NFC interface device or active RFID device 122 interacts with the Connected Tag 102, the wake-up signal 118 is raised and the controlled device 100 is woken up from its off state or low-power state (i.e. the controlled device 100 is switched on).

Different conditions may be used to the raise the wake-up signal 118. In one variant the wake-up signal is raised when the appearance—or the subsequent disappearance—of a field generated by an NFC interface device or active RFID device 122 is detected. In another variant the wake-up signal 118 is raised only when that NFC interface device or active RFID device 122 addresses this particular Connected Tag 102, i.e. upon establishment of an RFID connection. In yet another variant the wake-up signal 118 is only raised when the non-volatile memory 104—or predetermined memory cells thereof—have been written to or read from (or both) during the interaction. In other words, the raising of the wake-up signal 118 may be triggered by a general or a more specific event on the RFID connection 130, e.g. the appearance or removal of an RF field (general event) or the reading from or writing to a specific memory cell (specific event).

Thus, according to an exemplary embodiment of the invention, the RFID tag sends a wake-up signal to the controlled device upon a predetermined event, such that the controlled device wakes up from an off state or low-power state. According to a particular exemplary embodiment of the invention, the predetermined event is a detection of an RF field by the RFID tag or the establishment of the RFID connection. This enables that the controlled device is able to perform step (1) substantially instantaneously before the user interaction device performs step (2). According to another particular exemplary embodiment of the invention, the predetermined event is the writing of the operational parameters to the RFID tag in step (4) or the disappearance of the RF field or the RFID connection in step (4). This enables that the controlled device is able to perform step (5) substantially instantaneously after step (4).

FIG. 1 suggests that the wake-up signal 118 is fed to a pin of the host controller 112 causing it to wake up from an off state or low-power state. However, alternatively, the power supply of the controlled device 100 is disabled or disconnected in the inactive state and the wake-up signal 118 pulls a switch, e.g. galvanic or MOSFET, to power the controlled device 100 to cause it to move to the active state. In this way, the power consumption in the inactive state is zero, but no state can be retained in the controlled device 100 (other than the state of the non-volatile memory 104). This implies that some startup time (boot time) is required before the controlled device 100 is fully functional.

It is noted that the use of a wake-up signal 118 from the Connected Tag 102 may also be beneficial if the controlled device 100 is not switched off or in a low-power state. In this case, the wake-up signal 118 simply serves as an interrupt signal to the host controller 112, triggering it to start executing a subsequent step of the method.

Handshake Protocol Using Signaling Flag

In order to make step (2) instantaneously follow step (1), the act of bringing the user interaction device 120 into close proximity of the controlled device 100 (i.e. initiating step (2)) should trigger the host controller 112 to wake-up and provide the operational parameters to the Connected Tag 102 first (i.e. executing step (1)) before proceeding with step (2). In order to make step (5) instantaneously follow step (4), the writing of the changed operational parameters into the Connected Tag 102 by the user interaction device 120 (i.e. completing step (4)) should trigger the host controller 112 to wake up, read those operational parameters from the Connected Tag 102 and subsequently adapting its behavior based on these operational parameters (i.e. executing step (5)).

A further exemplary embodiment of a method according to the invention, which exhibits those features, is described below. This method makes use of different types of wake-up signals, varying from very specific wake-up triggers (e.g. a specific memory cell of the Connected Tag 102 being written) to very generic wake-up triggers (e.g. an RF field or RFID connection 130 appearing or disappearing). It is noted that the disappearance of the RF field or the RFID connection 130 may be a very natural wake-up trigger for causing the transition from step (4) to step (5); the end-user is ready with the user interaction and removes the user interaction device 120 from the close proximity of the controlled device 100, thereby removing the RF field and the RFID connection 130.

Effectively, a handshake protocol is executed between the user interaction device 120 and the host controller 112 of the controlled device 100 via the Connected Tag 102. In order to track the different states of this handshake protocol properly, a dedicated memory location—i.e. a signaling flag—is allocated in the non-volatile memory 104 of the Connected Tag 102.

Figure 2:
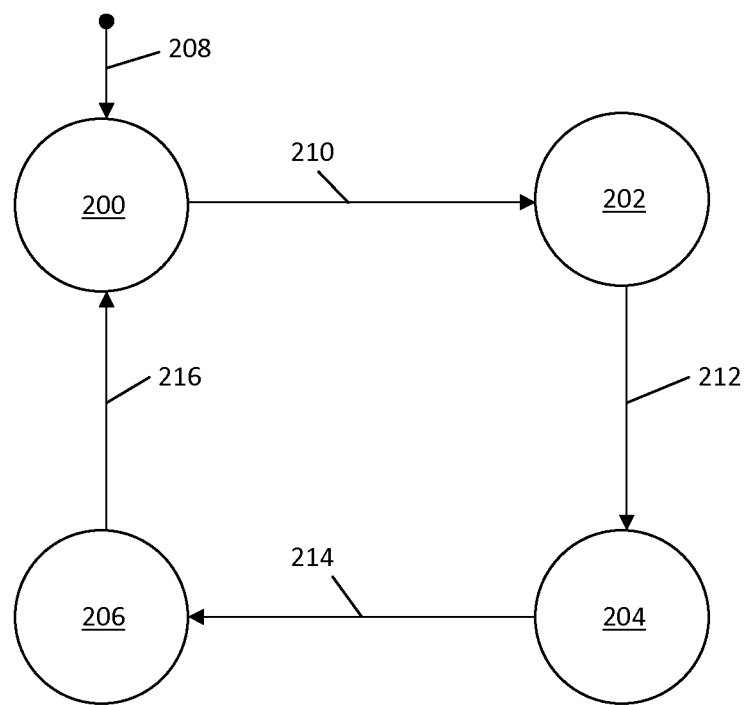
FIG. 2 shows exemplary values or states of a signaling flag for use in a handshake protocol according to an embodiment of the invention.

FIG. 2 shows exemplary values or states of a signaling flag for use in a handshake protocol according to an embodiment of the invention. In the exemplary method described below, this signaling flag may assume any of four values (states): "waiting for request" 200, "request parameters" 202, "parameters available" 204 and "parameters updated" 206. In an initialization step 208 the signaling flag is initialized with the value "waiting for request" 200.

Specifically, the writing of the signaling flag by the user interaction device 120 should cause the wake-up signal 118 being raised by the Connected Tag 102. Depending on the type of wake-up signal 118 used, other events (e.g. writing to another memory location, not being the signaling flag or even the mere appearance or disappearance of a random RF field) may cause the wake-up signal 118 to be raised as well. The exemplary method described below is made robust against such "false hits" by having the host controller 112 check the value of the signaling flag before proceeding with its next step. Although these "false hits" do not break the exemplary method as presented, they may cause more frequent (and unnecessary) wake-ups of the host controller 112, resulting in unnecessary power consumption. In other words, having the Connected Tag 102 support more specific wake-up triggers enables a reduced power consumption of the controlled device 100. For an energy frugal sensor node, for example, this may be beneficial.

A further exemplary embodiment of a method according to the invention comprises the following steps (it is noted that steps (1) and (5) of the above-described method are now split up in sub-steps):

(1a) The end-user brings the user interaction device 120 into close proximity of the controlled device 100 and the user interaction device 120 changes the value of the signaling flag in the Connected Tag 102 from "waiting for request" 200 to "request parameters" 202, resulting in a first state transition 210.

(1b) The Connected Tag 102 raises the wake-up signal 118 in response to this interaction with the Connected Tag 102, the host controller 112 wakes up and checks whether the signaling flag is set to "request parameters" 202. If so, the host controller 112 proceeds with the next step. If not, the host controller 112 may return to the off state or low-power state.

(1c) The host controller 112 obtains or computes the operational parameters and subsequently writes them into (another memory location of) the non-volatile memory 104. Subsequently, the host controller 112 sets the signaling flag to "parameters available" 204, resulting in a second state transition 212.

(2) The user interaction device 120 polls the signaling flag until it is set to "parameters available" 204 and subsequently reads the operational parameters from the Connected Tag 102.

(3) The end-user interacts with a user interface 126 on the user interaction device 120 resulting in changed operational parameters (i.e. new and/or updated operational parameters) for the controlled device 100.

(4) The end-user brings the user interaction device 120 again into close proximity of the controlled device 100—alternatively, it is kept in close proximity during the whole procedure—and the user interaction device 120 writes the new and/or updated operational parameters into the Connected Tag 102. Then, the user interaction device 120 sets the signaling flag to "parameters updated" 206, resulting in a third state transition 214.

(5a) The Connected Tag 102 raises the wake-up signal 118 in response to this interaction with the Connected Tag 102, the host controller 112 wakes up and checks whether the signaling flag is set to "parameters updated" 206. If so, the host controller 112 proceeds with the next step. If not, the host controller 112 may return to the off state or low-power state.

(5b) The host controller 112 reads the new and/or updated operational parameters from the Connected Tag 102 and subsequently adapts its behavior based on these operational parameters. Finally, the host controller 112 sets the signaling flag to "waiting for request" 200, resulting in a fourth state transition 216.

In case the wake-up signal 118 is triggered by the mere appearance of an RF field or an RFID connection, the following race condition may occur: the wake-up signal 118 being raised by the appearance of the RF field or the RFID connection and subsequently first the updated parameters and then the signaling flag being written by the user interaction device 120. As a result, in step (5a), the host controller 112 may check the signaling flag just before it is actually set to "parameters updated" 206 by the user interaction device 120 in step (4) and conclude that it does not have to proceed with step (5b). This race condition can be avoided by either the Connected Tag 102 delaying the raising of the wake-up signal 118 (e.g. by using an RC-filter) or by the host controller 112 polling the signaling flag over a certain period of time (e.g. 100 ms). If the wake-up signal 118 is triggered by the disappearance of the RF field or the RFID connection or by the actual writing of the memory cell containing the signaling flag, then this race condition does not occur.

Variants

It should be noted that many variants of the above-described further exemplary embodiment can be imagined. For example:

When it is necessary for step (2) to instantaneously follow step (1), but it is not necessary for step (5) to instantaneously follow step (4), only steps (1) and (2) comprise the use of the signaling flag. In this case the signaling flag may be two-valued.

When, reversely, it is not necessary for step (2) to instantaneously follow step (1), but it is necessary for step (5) to instantaneously follow step (4), only steps (4) and (5) comprise the use of the signaling flag. In this case the signaling flag may also be two-valued.

Alternatively, the handshake mechanism (including the maintaining of its state as embodied by the signaling flag) may be realized in dedicated control hardware of the Connected Tag 102. In this variant, the Connected Tag 102 provides the ability to intercept a read attempt of the non-volatile memory 104 via its RFID interface 106. When the user interaction device 120 attempts to read operational parameters, the Connected Tag 102 stalls the response to the user interaction device 120. In the mean time it wakes up the host controller 112 by means of the wake-up signal 118, the host controller 112 obtains or computes the operational parameters and subsequently writes them into the non-volatile memory 104 at which point the Connected Tag 102 completes the read attempt by providing the requested operational parameters to the user interaction device 120. As a matter of fact, intermediate storage of these operational parameters in the non-volatile memory 104 is not even strictly necessary for this variant. Alternatively, the read attempt could be stalled by the dedicated control hardware of the Connected Tag 102 by a fixed amount of time, while the wake-up signal 118 is provided to the host controller 112. This fixed amount of time should be sufficiently large for the host controller 112 to wake-up, obtain or compute the operational parameters and write them into the non-volatile memory 104. For example, the amount of time may be 100 ms. However, it should be noted that this variant is more complex, because the Connected Tag 102 is no longer a relatively simple dual-ported non-volatile memory 104—having an RFID interface 106 and a host connection 116—with a wake-up capability, but a component which requires more complex control circuitry.

Waking Up the Controlled Device Selectively

In the section "User interaction with a controlled device that is switched off" it has been explained that in some cases it is beneficial to interact with the controlled device 100 while it remains switched off, whereas in the section "Wake up host controller during or following interaction" it has been explained that in other cases the controlled device 100 should be woken up prior to and/or directly following user interaction.

It may happen that for a single application, some operations performed during user interaction require the controlled device 100 to wake up prior to and/or directly following user interaction, while for other operations this is not necessary. This can be accomplished by configuring the Connected Tag 102 to provide a wake-up signal 118 only upon reading and/or writing operational parameters (i.e. sets of memory cells of non-volatile memory 104) relating to those operations that require waking up. Obviously, the memory cell containing signaling flag is a prime candidate for providing a wake-up signal 118 when it is written to by the user interaction device 120.

This configurability can be achieved by the host processor 112 writing configuration parameters into a special area of the non-volatile memory 104 by means of the host connection 116. For example, this special area could contain bitmaps indicating which areas of the non-volatile memory 104 must cause a wake-up when addressed for reading and/or writing, and which areas must not cause a wake-up. Control logic in the Connected Tag 102 will interpret the configuration parameters to decide whether or not to trigger the wake-up signal 118 upon addressing a specific memory cell.

For example, if the controlled device is a washing machine, then different settings can be programmed without wake-up, for example the temperature and the washing program. However, when the "start program" button is pushed on the user interaction device 120—or when a timer is programmed to start the washing machine at a certain moment in time—a wake-up is necessary.

According to another example, if the controlled device 100 is an energy-frugal sensor node it may not be necessary to wake it up when the operational parameters are typical configuration settings which need to be programmed into it—such as the set of physical quantities to measure and the associated measurement accuracies—or when the operational parameters consist of actual measurements of slowly changing physical phenomena which need to be checked—such as the room temperature. However, it may be necessary to wake it up when the operational parameters consist of measurements of quickly changing physical phenomena—such as a lighting level—or when it is enabled for duty-cycled operation for the first time. In this case it is assumed that the energy-frugal sensor node wakes up periodically to perform measurements—and log the results thereof in the non-volatile memory 104 and/or transmit them over a wireless interface—and that the slowly changing phenomena show little change during a single period, whereas the quickly changing phenomena may show a lot of change during a single period.

Operational Parameters Include a User Interface Description

The operational parameters supplied by the controlled device 100 to the user interaction device 120 as part of step (2) of a method of the kind set forth may comprise a user interface description in addition to—or effectively embedding—operational parameters that directly relate to the functioning of the controlled device 100. For the sake of clarity, the latter are called function parameters in this section.

For example, an HTML-page containing the function parameters as (default settings for) e.g. radio button selectors, check boxes, and/or pull down menu controls may be provided as operational parameter. In step (3), the user interaction device 120 will load this HTML-page into an HTML-renderer application enabling the end-user to modify the various controls (and hence the function parameters). The HTML-renderer application is very similar to an Internet browser, but the protocols to communicate with the Connected Tag 102 may be different from plain HTTP. For example, the HTML-renderer application may be realized by means of a standard browser and an embedded web server that converts those protocols to/from HTTP. After the end-user has finished modifying the controls, the function parameters must be "posted" back to the controlled device 100 as part of step (4). This action of "posting" the function parameters can be triggered by a "submit" button on the HTML-page or, alternatively, by the end-user bringing the user interaction device 120 into close proximity of the controlled device 100. In the former case, the end-user needs to press the "submit" button while the user interaction device 120 is in close proximity of the controlled device 100. A combination of the two is also possible: either the end-user pressing the "submit" button in close proximity, or the end-user first pressing the "submit" button and subsequently bringing the user interaction device 120 into close proximity again.

The benefit of including a user interface description in the operational parameters is the ability to have a dedicated user interface 126 for each type of controlled device 100. The user interaction device 120 requires no a priori knowledge of the controlled device 100 and yet is able to provide an optimally tailored user interface 126 for it to the end-user. In other words, it is not necessary to install a different "app" on the user interaction device 120 for each different type of controlled device 100. Instead, a single generic (protocol-adapted) browser suffices, such that the browser may be standardized. The user interface 126 could also be branded by the manufacturer of the controlled device 100. Alternatively, or in addition, the user interface description may comprise client-executable code such as JavaScript, CSS, Java or Adobe Flash—stored as additional files on the Connected Tag 102—offering a more dynamic (e.g. animated) user interface experience and/or the possibility to compute function parameters from more user-friendly settings. For example, a temperature setting on the user interface 126 for a washing machine may be in Celsius or Fahrenheit, while the parameters accepted by the washing machine are in yet another unit of measurement.

As a variant, the user interface description may be provided by reference, for example by the controlled device 100 providing a URL pointing to a user interface description—instead of the user interface description itself—as part of the operational parameters. In this case, the user interaction device 120 furthermore needs to comprise Internet access means, for example, a Wi-Fi radio or a GPRS/UMTS modem. This is typically the case when the user interaction device 120 is a smart phone or a web tablet. In this variant, the user interaction device 120 uses the URL thus obtained to retrieve the actual user interface description utilizing the Internet access means and subsequently presents a user interface 126 in accordance with this description to the end-user (after which the method proceeds as outlined above). The benefit of this variant is that the non-volatile memory 104 of the Connected Tag 102 needs to provide less data (a URL typically being much smaller than a user interface description) reducing the cost of the controlled device 100 and possibly also the download time of the user interface description. As this effectively removes any size constraint on the user interface description, the user interface description could even be a dedicated application that is automatically downloaded and installed on the user interaction device 120. Another benefit is that the manufacturer of the controlled device 100 can easily update the user interface description by providing a new version on his website. It is noted that in this example it is assumed that the URL points to the website of the manufacturer.

It is also noted that multiple message exchanges between the controlled device 100 and the user interaction device 120 may take place as part of a single user interaction session. This means that once a user interface description (and possibly initial function parameters) have been obtained from the controlled device 100 in a first step (2), the user interaction device 120 may go through steps (2), (3), and (4) of the method more than once and the controlled device 100 may be involved in steps (1), (2), (4) and (5) more than once. In subsequent iterations, the user interface description may remain the same, or it may change (e.g. browse to new HTML-pages to obtain submenus). The point of this is that some state information (in this case a user interface description with actual settings for the function parameters) may be maintained by the user interaction device 120 while performing the method multiple times.

Furthermore, it is noted that the user interaction device 120 may cache the user interface description, so that it is not necessary to download it (from the controlled device 100 or from the Internet) each and every time that interaction with the controlled device 100 is needed. Upon reading the operational parameters from the controlled device 100, the user interaction device 120 obtains a unique identifier of the user interface description (in the variant above this is the URL) and checks whether it has already downloaded a user interface description with this unique identifier. Only if it has not, it will download the user interface description.

Many application examples can be imagined. For any of the exemplary applications described above (energy-frugal sensor node, household appliance, time-controlled electric plug, and electronic watch) it would be beneficial to have a dedicated user interface.

Yet another example is a pin-code lock for, for example, a scooter. The user interaction device 120 (for example a smart phone) obtains a user interface description from the scooter through the Connected Tag 102. This user interface description supports the pin-code entry and writes the entered pin-code back into the Connected Tag 102. The scooter is woken up by writing into the Connected Tag 102 (see section "Wake up host controller during or following interaction"). Subsequently, the scooter verifies the pin-code and releases the lock if the pin-code is correct. It is noted that in this case the user interface description is the only operational parameter read from the controlled device 100 (i.e. the scooter); no function parameters are read and only one function parameter is written (i.e. the pin-code). However, a more secure solution involves using a public/private key pair (i.e. public key cryptography). The smart phone first reads a user interface description and a public key from the scooter, in particular from its Connected Tag 102, subsequently uses the user interface 126 to obtain the pin-code from the end-user, encrypts the pin-code with the public key and writes it back to the scooter, in particular to its Connected Tag 102. The Connected Tag 102 wakes up the scooter, which first decrypts the pin-code with its private key. Subsequently the scooter verifies the pin-code, and if the pin-code is correct the scooter releases the lock.

The above-mentioned embodiments illustrate rather than limit the invention, and the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. The invention may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 controlled device
102 RFID tag
104 non-volatile memory
106 RFID interface
108 tag controller
110 host memory
112 host controller
114 controlled functions
116 host connection
118 optional wake-up signal
120 user interaction device
122 NFC interface device or active RFID device
124 controller
126 user interface
128 memory
130 RFID connection
200 "waiting for request" state
202 "request parameters" state
204 "parameters available" state
206 "parameters updated" state
208 initialize
210 first state transition
212 second state transition
214 third state transition
216 fourth state transition

The invention claimed is:

1. A method for controlling a controlled device, wherein the controlled device comprises an RFID tag and a host controller, wherein the RFID tag is connected to the host controller via a wired host connection, the method comprising the following steps:
 (s1) the host controller writes operational parameters to the RFID tag through the host connection;
 (s2) a user interaction device reads the operational parameters from the RFID tag through an RFID connection;
 (s3) a user changes the operational parameters via a user interface comprised in the user interaction device;
 (s4) the user interaction device writes the operational parameters to the RFID tag through the RFID connection;
 (s5) the host controller reads the operational parameters from the RFID tag through the host connection and adapts the behavior of the controlled device by configuring a set of controlled functions based on the operational parameter;
 wherein the RFID tag sends a wake-up signal to the controlled device upon a predetermined event, such that the controlled device wakes up from an off state or low-power state;
 wherein a handshake protocol is executed between the user interaction device and the controlled device via the RFID tag, such that the controlled device may return to the off state or low-power state if it does not need to perform a step of the method;
 wherein the handshake protocol comprises that the user interaction device changes a signaling flag comprised in the RFID tag;
 wherein the signaling flag indicates whether or not the controlled device needs to perform a specific step of the method;
 wherein, upon waking up, the controlled device reads the signaling flag and returns to the off state or low-power state if the signaling flag indicates that it does not need to perform any specific step of the method.

2. A method as claimed in claim 1,
 wherein the predetermined event is a detection of an RF field by the RFID tag or the establishment of the RFID connection.

3. A method as claimed in claim 1,
 wherein the predetermined event is the writing of the operational parameters to the RFID tag in step (s4) or the disappearance of the RF field or the RFID connection in step (s4).

4. A method as claimed in claim 1,
 wherein the RFID tag only provides the wake-up signal to the controlled device if predetermined sections of a memory comprised in the RFID tag are read from and/or written to by the user interaction device;
 wherein the predetermined sections of the memory contain operational parameters relating to operations that require a wake-up of the controlled device.

5. A method as claimed in claim 4,
 wherein the operational parameters include a description of the user interface comprised in the user interaction device.

6. A method as claimed in claim 5,
 wherein the description of the user interface embeds operational parameters which directly relate to the functioning of the controlled device.

7. A method as claimed in claim 5,
 wherein the description of the user interface is provided by reference, in particular by a URL pointing to a website from which the description of the user interface is retrievable.

8. A method for controlling a controlled device, wherein the controlled device comprises an RFID tag and a host controller, wherein the RFID tag is connected to the host controller via a wired host connection, the method comprising the following steps:
 (s1) the host controller writes operational parameters to the RFID tag through the host connection;
 (s2) a user interaction device reads the operational parameters from the RFID tag through an RFID connection;
 (s3) a user changes the operational parameters via a user interface comprised in the user interaction device;
 (s4) the user interaction device writes the operational parameters to the RFID tag through the RFID connection;

(s5) the host controller reads the operational parameters from the RFID tag through the host connection and adapts the behavior of the controlled device by configuring a set of controlled functions based on the operational parameter;
wherein the RFID tag sends a wake-up signal to the controlled device upon a predetermined event, such that the controlled device wakes up from an off state or low-power state, wherein the predetermined event is the disappearance of the RF field or the disappearance of the RFID connection in step (s4).

\* \* \* \* \*